(12) United States Patent
Kang et al.

(10) Patent No.: US 12,495,017 B2
(45) Date of Patent: *Dec. 9, 2025

(54) ELECTRONIC DEVICE FOR PROVIDING NOTIFICATION VIEW AND CONTROL METHOD THEREOF

(71) Applicant: Samsung Electronics Co., Ltd., Suwon-si (KR)

(72) Inventors: Jisoo Kang, Suwon-si (KR); Daehyung Jo, Suwon-si (KR); Jaejin Ahn, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,434

(22) Filed: May 28, 2024

(65) Prior Publication Data

US 2024/0314099 A1 Sep. 19, 2024

Related U.S. Application Data

(63) Continuation of application No. 18/139,680, filed on Apr. 26, 2023, now Pat. No. 12,021,816, which is a
(Continued)

(30) Foreign Application Priority Data

Oct. 26, 2020 (KR) .................. 10-2020-0139743

(51) Int. Cl.
*H04L 51/224* (2022.01)
*H04L 51/216* (2022.01)
(Continued)

(52) U.S. Cl.
CPC .......... *H04L 51/224* (2022.05); *H04L 51/216* (2022.05); *G06F 1/163* (2013.01); *H04L 51/04* (2013.01)

(58) Field of Classification Search
CPC ..... H04L 51/04; H04L 51/216; H04L 51/224; G06F 1/163
See application file for complete search history.

(56) References Cited

U.S. PATENT DOCUMENTS 7,818,378 B2 10/2010 Buchheit et al.
8,380,798 B2 2/2013 Jackson et al.
(Continued)

FOREIGN PATENT DOCUMENTS

CN 107360008 B 9/2020
KR 20110126421 A 11/2011
(Continued)

OTHER PUBLICATIONS

International Search Report and Written Opinion for International Application No. PCT/KR2021/015120; International Filing Date Oct. 26, 2021; Date of Mailing Feb. 4, 2022; 48 pages.

*Primary Examiner* — G. C. Neurauter, Jr.
(74) *Attorney, Agent, or Firm* — CANTOR COLBURN LLP

(57) ABSTRACT

An electronic device comprises a display connected to a processor, wherein the processor can display at least a part of at least one first message included in a first notification, confirm whether a first chat group corresponding to the first message is the same as a second chat group corresponding to second messages included in a second notification, if the second notification is acquired while at the first message is displayed, confirm, on the basis of the first message and the plurality of second messages, at least one new message included in the second messages, if the first chat group is the same as the second chat group, further display at least one new message while the first message is displayed, and display an indicator related to the second notification while
(Continued)

the first message is displayed, if the first chat group and second chat group are different from each other.

20 Claims, 8 Drawing Sheets

Related U.S. Application Data continuation of application No. PCT/KR2021/015120, filed on Oct. 26, 2021.

(51) Int. Cl.
*G06F 1/16* (2006.01)
*H04L 51/04* (2022.01)

(56) References Cited

U.S. PATENT DOCUMENTS

| | | |
|---|---|---|
| 8,756,312 B2 | 6/2014 | Malloy et al. |
| 10,257,670 B2 | 4/2019 | Agarwal et al. |
| 10,268,340 B2 | 4/2019 | Chen et al. |
| 10,621,955 B2 | 4/2020 | Heo et al. |
| 10,725,626 B2 | 7/2020 | Meixner et al. |
| 11,310,182 B2 | 4/2022 | Liu et al. |
| 11,656,740 B2 | 5/2023 | Klassen et al. |
| 12,021,816 B2 * | 6/2024 | Kang ............... H04M 1/72412 |
| 2006/0150175 A1 | 7/2006 | Etelapera |
| 2009/0298476 A1 | 12/2009 | Choi et al. |
| 2011/0282953 A1 | 11/2011 | Lee et al. |
| 2012/0150885 A1 | 6/2012 | Kwiatknowski et al. |
| 2016/0065519 A1 | 3/2016 | Waltermann et al. |
| 2016/0085381 A1 | 3/2016 | Parker et al. |
| 2016/0313877 A1 | 10/2016 | Ha et al. |
| 2017/0054664 A1 | 2/2017 | Lee et al. |
| 2018/0255015 A1 | 9/2018 | Ahn |
| 2019/0058973 A1 | 2/2019 | Hsieh et al. |
| 2019/0155459 A1 | 5/2019 | Chen et al. |
| 2019/0191027 A1 | 6/2019 | Chandrasekaran et al. |
| 2019/0357021 A1 | 11/2019 | Kim et al. |

FOREIGN PATENT DOCUMENTS

| | | |
|---|---|---|
| KR | 20160075457 A | 6/2016 |
| KR | 20160126354 A | 11/2016 |
| KR | 101695917 B1 | 1/2017 |
| KR | 101839226 B1 | 3/2018 |
| KR | 102103665 B1 | 4/2020 |

* cited by examiner

|   | 0 | A | C | A | Y | K | P |
|---|---|---|---|---|---|---|---|
| 0 | 0 | 0 | 0 | 0 | 0 | 0 | 0 |
| C | 0 | 0 | 1 | 1 | 1 | 1 | 1 |
| A | 0 | 1 | 1 | 2 | 2 | 2 | 2 |
| P | 0 | 1 | 1 | 2 | 2 | 2 | 3 |
| C | 0 | 1 | 2 | 2 | 2 | 2 | 3 |
| A | 0 | 1 | 2 | 3 | 3 | 3 | 3 |
| K | 0 | 1 | 2 | 3 | 3 | 4 | 4 |

FIG. 8

ELECTRONIC DEVICE FOR PROVIDING NOTIFICATION VIEW AND CONTROL METHOD THEREOF

CROSS-REFERENCE TO RELATED APPLICATION(S)

This application is a continuation application of U.S. application Ser. No. 18/139,680 filed on Apr. 26, 2023, claiming priority under § 365(c), of International Application No. PCT/KR2021/015120, filed on Oct. 26, 2021, which is based on and claims the benefit of Korean patent application number 10-2020-0139743, filed on Oct. 26, 2020, in the Korean Intellectual Property Office, the disclosures of which are incorporated by reference herein in their entireties.

BACKGROUND

1. Field

Various embodiments of the disclosure relate to an electronic device for providing a notification view and a method for controlling the same.

2. Description of Related Art

With the development of technologies, a plurality of electronic devices are linked with each other to provide various services and additional functions. In particular, as a wearable device or a secondary device worn on a part of a user's body linked with a smartphone, a user may identify an event, which is generated in an application installed in a smartphone, through the wearable device or secondary device without directly viewing the smartphone. For example, when a new message is received through a message application of a smartphone, the user may identify whether the new message has been received and a content thereof through the wearable device or secondary device without directly viewing the smartphone.

In many cases, one notification from a wearable device or secondary device may include a message history including a previous conversation history, and in order to include the message history in a notification, a page of a wearable extender of a notification or a messaging style notification may be used.

SUMMARY

In the case of an application, a unique ID is assigned to each received or sent message, and thus information on newly received, sent, modified, or deleted messages may be identified. However, a message included in a notification transmitted to a wearable device or secondary device does not include a unique ID.

Accordingly, it is impossible to distinguish a new message from among a plurality of messages included in a notification and, even when the plurality of notifications include the same message, the wearable device or secondary device could not identify the same message included in each of the plurality of notifications.

Accordingly, when a new notification is received while providing a notification view for an existing notification, the wearable device or secondary device could not distinguish a new message from among a plurality of messages included in the notification, and thus the wearable device or secondary device may be configured to display only an indicator indicating that a notification has been received or only replace the existing notification view by a notification view for a new notification, and may not provide an update in the form of adding only a new message to the existing notification view.

In particular, when the wearable device or secondary device receives a large number of messages within a short period of time and thus a single notification includes a large number of new messages, or when a notification includes a large number of new messages due to a connection issue with an external device, it is more difficult to provide an update in the form of adding only new messages to the existing notification view.

Various embodiments of the disclosure are to provide an electronic device capable of identifying a new message included in a new notification and adding and displaying only the identified new message to an existing notification view, even when the message included in the notification does not include a unique identification (ID), and a method for controlling the same.

The technical problem to be solved in the disclosure is not limited to the technical problem mentioned above, and other technical problems not mentioned can be clearly understood, from the description below, by a person skilled in the art to which the disclosure belongs.

According to various embodiments, an electronic device may include a display and a processor operatively connected to the display, wherein the processor is configured to display, on the display, at least a part of at least one first message included in a first notification, in case that a second notification is acquired while at least a part of the at least one first message is displayed, identify whether a first chat group corresponding to the at least one first message is the same as a second chat group corresponding to a plurality of second messages included in the second notification, in case that the first chat group is the same as the second chat group, identify at least one new message included in the plurality of second messages based on the at least one first message and the plurality of second messages, and further display, on the display, the at least one new message while at least a part of the at least one first message is displayed, and in case that the first chat group and the second chart group are different from each other, display, on a part of the display, an indicator related to the second notification while at least a part of the at least one first message is displayed.

According to various embodiments, a method for controlling an electronic device may include displaying at least a part of at least one first message included in the first notification on a display, in case that a second notification is acquired while at least a part of the at least one first message is displayed, identifying whether a first chat group corresponding to the at least one first message is the same as a second chat group corresponding to a plurality of second messages included in the second notification, in case that the first chat group is the same as the second chat group, identifying at least one new message included in the plurality of second messages based on the at least one first message and the plurality of second messages, and further displaying, on the display, the at least one new message while at least a part of the at least one first message is displayed, and in case that the first chat group and the second chart group are different from each other, displaying, on a part of the display, an indicator related to the second notification while at least a part of the at least one first message is displayed.

An electronic device according to various embodiments of the disclosure can provide a user with an experience similar to that of an application for seamlessly updating a message without a dedicated application, by identifying a new message included in a new notification and updating only the new message to an existing notification view.

In addition, various effects directly or indirectly identified through this document can be provided.

BRIEF DESCRIPTION OF THE DRAWINGS

FIG. 8 illustrates an operation of identifying a new message included in a new notification according to various embodiments.

DETAILED DESCRIPTION

Figure 1:
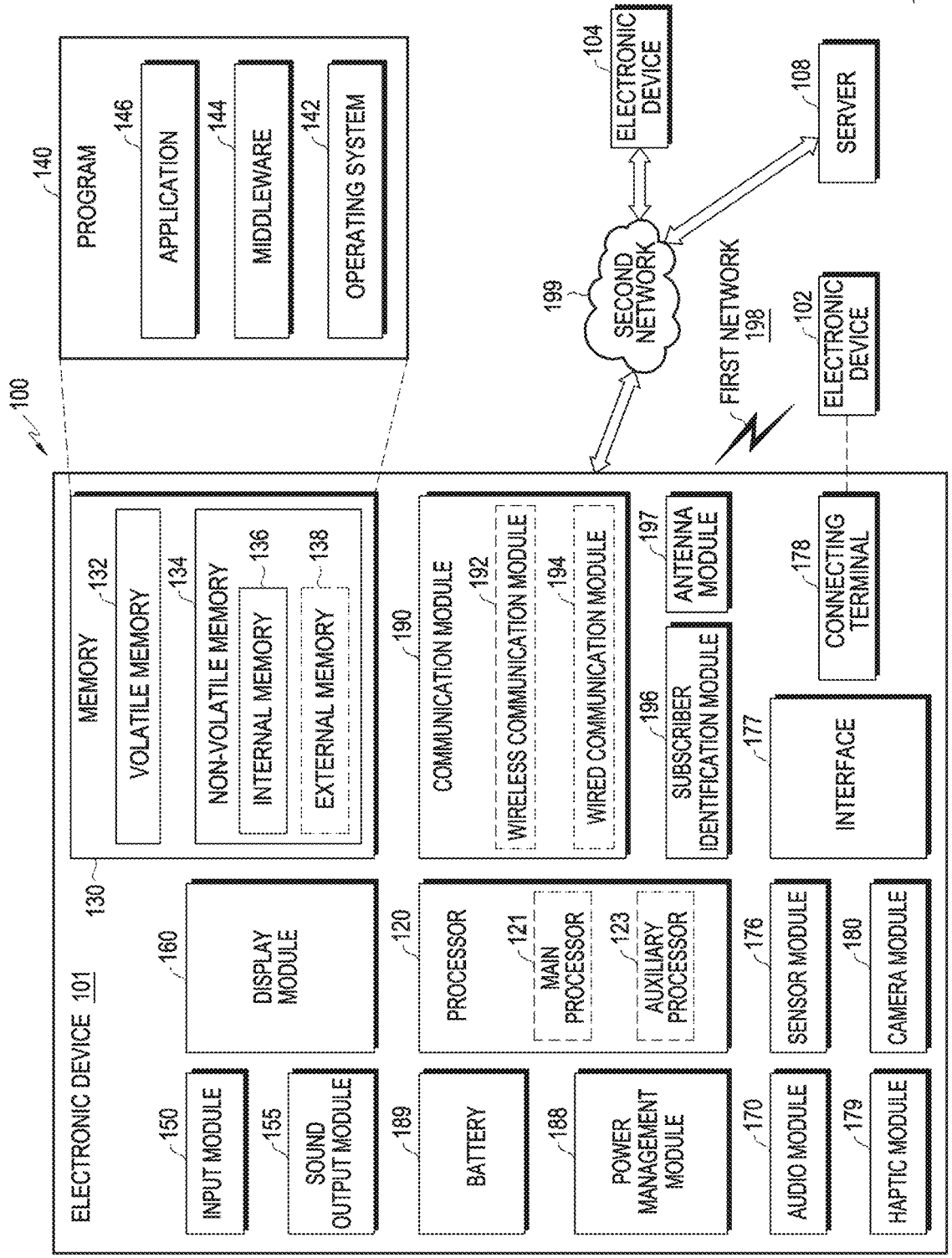
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (cMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
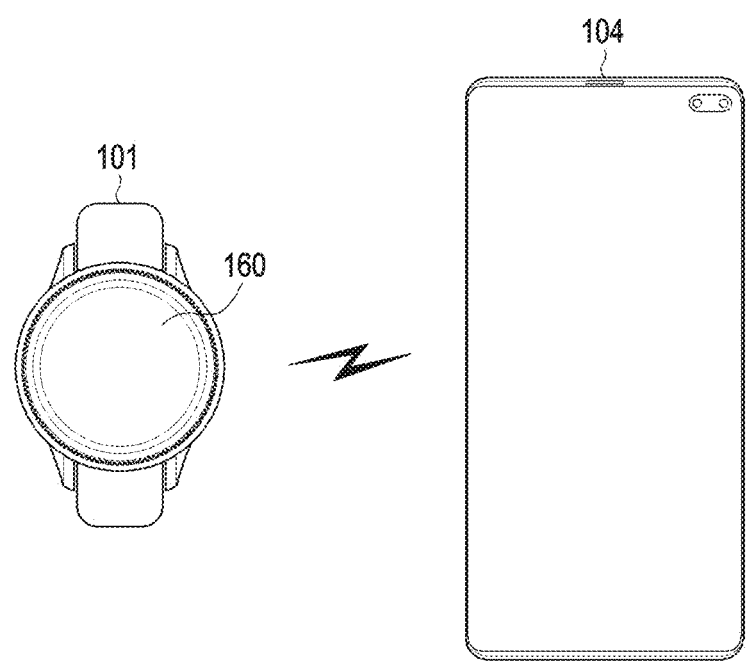
FIG. 2 illustrates an operating environment of an electronic device according to various embodiments.

FIG. 2 illustrates an operating environment of an electronic device according to various embodiments.

According to various embodiments, referring to FIG. 2, an electronic device 101 (e.g., the electronic device 101 of FIG. 1) may communicate with an external device 104 (e.g., the electronic device 104 of FIG. 1) through a communication module (e.g., the communication module 190 of FIG. 1). The terms electronic device 104 and external device 104 may be utilized interchangeably.

According to various embodiments, the external device 104 (e.g., the electronic device 104 of FIG. 1) may transmit data to the electronic device 101 (e.g., the electronic device 101 of FIG. 1). For example, upon receiving a new message, the external device 104 (e.g., the electronic device 104 of FIG. 1) may transmit a notification for the new message to the electronic device 101 (e.g., the electronic device 101 of FIG. 1) or transmit a control signal for controlling the electronic device 101 (e.g., the electronic device 101 of FIG. 1).

For example, the external device 104 (e.g., the electronic device 104 of FIG. 1) may be an electronic device capable of performing an operation based on an application, such as a smartphone, a tablet PC, a laptop, a smart TV, or a desktop.

According to various embodiments, the electronic device 101 (e.g., the electronic device 101 of FIG. 1) may be a wearable device that can be worn on a part of a user's body. For example, the electronic device 101 (e.g., the electronic device 101 of FIG. 1) may include a smart watch, smart glasses, or a head mounted display (HMD) including a display (e.g., the display module 160 of FIG. 1).

According to various embodiments, the electronic device 101 (e.g., the electronic device 101 of FIG. 1) may be a portable device that can be carried by a user even when it is not worn on a part of the user's body.

According to various embodiments, when the electronic device 101 (e.g., the electronic device 101 of FIG. 1) receives a notification including at least one message from the external device 104 (e.g., the electronic device 104 of FIG. 1), the electronic device 101 may display at least a part of the at least one message on the display 160 (e.g., the display module 160 of FIG. 1). According to various embodiments, the at least one message included in a notification received from the external device 104 (e.g., the electronic device 104 of FIG. 1) may not include a unique ID.

According to various embodiments, when a new notification is received while the electronic device 101 (e.g., the electronic device 101 of FIG. 1) displays a message for the received notification, the electronic device may additionally display only a new message among a plurality of messages included in the new notification.

A new message identification operation and a new message display operation of the electronic device 101 (e.g., the electronic device 101 of FIG. 1) according to various embodiments will be described below with reference to FIGS. 3 to 8.

Figure 3:
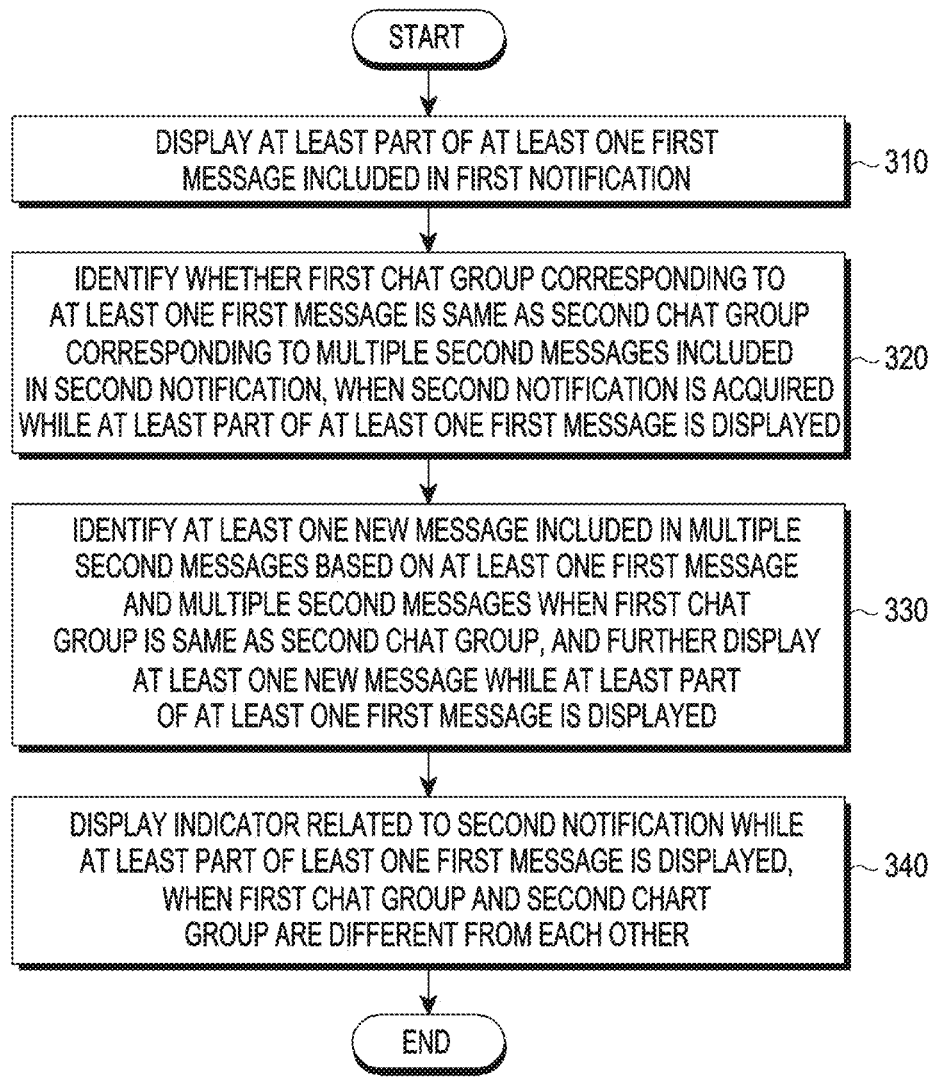
FIG. 3 illustrates a method of operating an electronic device according to various embodiments.

FIG. 3 illustrates a method for operating an electronic device according to various embodiments.

According to various embodiments, the electronic device (e.g., the processor 120 of the electronic device 101 of FIG. 1 or the electronic device 101 of FIG. 2) may provide a notification view fora notification received from an external device (e.g., the electronic device 104 of FIG. 1 or the external device 104 of FIG. 2) or a notification generated by the electronic device (e.g., the processor 120 of the electronic device 101 of FIG. 1 or the electronic device 101 of FIG. 2). For example, the providing of the notification view may refer to displaying, on a display (e.g., the display module 160 of FIG. 1), at least one message included in the notification received from the external device (e.g., the electronic device 104 of FIG. 1 or the external device 104 of FIG. 2) or in the notification generated by the electronic device (e.g., the processor 120 of the electronic device 101 of FIG. 1 or the electronic device 101 of FIG. 2). For example, the displaying of the at least one message included in the notification may refer to displaying the body of the at least one message included in the notification. According to various embodiments, information on a sender and/or a reception time of at least one message may be displayed together with the message body. For example, the electronic device (e.g., the processor 120 of the electronic device 101 of FIG. 1 or the electronic device 101 of FIG. 2) may display each of at least one message included in the notification in the form of a speech bubble (or bubble view).

According to various embodiments, referring to FIG. 3, in operation 310, the electronic device (e.g., the processor 120 of the electronic device 101 of FIG. 1 or the electronic device 101 of FIG. 2) may display at least a part of the at least one first message included in a first notification. For example, when there is one first message included in the first notification, one first message is displayed, and when there are a plurality of first messages included in the first notification, one or more first messages may be displayed.

According to various embodiments, a notification may be received from an external device (e.g., the electronic device 104 of FIG. 1 or the external device 104 of FIG. 2) through a communication module (e.g., the communication module 190 of FIG. 1) or may be generated by an electronic device (e.g., the processor 120 of the electronic device 101 of FIG. 1 or the electronic device 101 of FIG. 2), and each notification may include at least one message. For example, when the notification is related to an interactive application, one notification may include not only a new message but also at least one message corresponding to an existing conversation history. For example, the new message may imply a message obtained after receiving the first notification and not included in the first notification, among at least one message included in the second notification.

According to various embodiments, when a plurality of messages are included in one notification, the plurality of messages may be arranged in a time sequence of reception or transmission (e.g., the passage of time or ascending order). According to various embodiments, at least one message included in the notification may be referred to as a message history.

According to various embodiments, the number of at least one message included in one notification, that is, the number (of individual messages) of message history may be determined based on application configuration, the configuration of an electronic device (e.g., the processor 120 of the electronic device 101 of FIG. 1 or the electronic device 101 of FIG. 2) or an external device (e.g., the electronic device 104 of FIG. 1 or the external device 104 of FIG. 2), and/or the number of messages received or sent within the same chat group. For example, the number of message history included in one notification may be about 10. However, when the number of received or sent messages within the same chat group is less than the configured number of message history, the number of received or sent messages may be the number of message history included in one notification.

According to various embodiments, when a notification is received from an external device (e.g., the electronic device 104 of FIG. 1 or the external device 104 of FIG. 2) or generated by an electronic device (e.g., the processor 120 of the electronic device 101 of FIG. 1 or the electronic device 101 of FIG. 2), the electronic device (e.g., the processor 120 of the electronic device 101 of FIG. 1 or the electronic device 101 of FIG. 2) may display at least a part of at least one message included in the notification on a display (e.g., the display module 160 of FIG. 1).

For example, the electronic device (e.g., the processor 120 of the electronic device 101 of FIG. 1 or the electronic device 101 of FIG. 2) may display a part or all of at least one message included in the notification on a display (e.g., the display module 160 of FIG. 1), based on the number of messages that can be displayed on the display (e.g., the display module 160 of FIG. 1).

According to various embodiments, the electronic device (e.g., the processor 120 of the electronic device 101 of FIG. 1 or the electronic device 101 of FIG. 2) may display all of at least one message included in the notification on a display (e.g., the display module 160 of FIG. 1) when the number of at least one message(s) included in the notification is less than the number of messages that can be displayed on the display (e.g., the display module 160 of FIG. 1).

As another embodiment, when the number of at least one message(s) included in the notification is larger than the number of messages that can be displayed on the display (e.g., the display module 160 of FIG. 1), the electronic device (e.g., the processor 120 of the electronic device 101 of FIG. 1 or the electronic device 101 of FIG. 2) may display, on the display (e.g., the display module 160 of FIG. 1), as many messages as the number of messages that can be displayed on the display (e.g., the display module 160 of FIG. 1), starting from the most recent message of the at least one message included in the notification.

According to various embodiments, in operation 320, when a second notification is obtained while at least a part of the at least one first message is displayed, the electronic device (e.g., the processor 120 of the electronic device 101 of FIG. 1 or the electronic device 101 of FIG. 2) may identify whether a first chat group corresponding to the at least one first message and a second chat group corresponding to a plurality of second messages included in the second notification are the same. According to various embodiments, the second notification may include one second message. According to various embodiments, a chat group may be referred to as a chat room, and may include two or three or more participants.

For example, the electronic device (e.g., the processor 120 of the electronic device 101 of FIG. 1 or the electronic device 101 of FIG. 2) may compare panel identifications (IDs) of the first notification and the second notification so as to identify whether the first group and the second group are the same. For example, the panel ID is a value included in notification data received from an external device (e.g., the electronic device 104 of FIG. 1 or the external device 104 of FIG. 2), and may distinguish a chat room of a message included in a notification and may be referred to as a key. According to various embodiments, the electronic device (e.g., the processor 120 of the electronic device 101 of FIG. 1 or the electronic device 101 of FIG. 2) may identify whether the first chat group and the second chat group are the same, based on at least one of application information related to each of the first notification and the second notification, participant information of each of the first chat group and the second chat group, message contents, and/or message reception time. According to various embodiments, the electronic device (e.g., the processor 120 of the electronic device 101 of FIG. 1 or the electronic device 101 of FIG. 2) may identify whether chat groups are the same according to a criterion determined for each application in addition to the above-described method.

According to various embodiments, in operation 330, when the first chat group and the second chat group are the same, the electronic device (e.g., the processor 120 of the electronic device 101 of FIG. 1 or the electronic device 101 of FIG. 2) may identify at least one new message included in the plurality of second messages (included in the second notification) based on the at least one first message and the plurality of second messages, and may further display at least one new message while at least a part of the at least one first message is displayed.

For example, when the first chat group and the second chat group are the same, the electronic device (e.g., the processor 120 of the electronic device 101 of FIG. 1 or the electronic device 101 of FIG. 2) may identify, among the plurality of second messages, a later message after a message corresponding to at least a part of the at least one first message, as a new message.

According to various embodiments, the electronic device (e.g., the processor 120 of the electronic device 101 of FIG. 1 or the electronic device 101 of FIG. 2) may identify whether the at least one first message and each of the plurality of second messages are the same, based on at least one of application information related to each of a first notification and a second notification, participant information of each of a first chat group and a second chat group, message contents, and message reception time.

According to various embodiments, the plurality of second messages may include or not include one or more new messages, as compared to the at least one first message.

An operation of identifying a new message according to various embodiments will be described below with reference to FIGS. 6 to 8.

According to various embodiments, the electronic device (e.g., the processor 120 of the electronic device 101 of FIG. 1 or the electronic device 101 of FIG. 2) may display a new message, among a plurality of second messages included in a second notification, at a corresponding position in an order in which a plurality of second messages included in the second notification are received. For example, the electronic device (e.g., the processor 120 of the electronic device 101 of FIG. 1 or the electronic device 101 of FIG. 2) may additionally display the new message at a corresponding position in an order in which a plurality of second messages included in the second notification are received, that is, may additionally display the new message before at least a part of the displayed at least one first message, or in the middle of or after the first message.

In another embodiment, the electronic device (e.g., the processor 120 of the electronic device 101 of FIG. 1 or the electronic device 101 of FIG. 2) may move at least one first message displayed on a display (e.g., the display module 160 of FIG. 1) to one side of the display (e.g., the display module 160 of FIG. 1), and may display at least one new message on the other side of the display (e.g., the display module 160 of FIG. 1). For example, the electronic device (e.g., the processor 120 of the electronic device 101 of FIG. 1 or the electronic device 101 of FIG. 2) may move the at least one first message displayed on the display (e.g., the display module 160 of FIG. 1) to the upper side of the display (e.g., the display module 160 of FIG. 1), and display the at least one new message on the lower side of the display (e.g., the display module 160 of FIG. 1), based on a first message display direction. As another embodiment, the electronic device (e.g., the processor 120 of the electronic device 101 of FIG. 1 or the electronic device 101 of FIG. 2) may move the at least one first message displayed on the display (e.g., the display module 160 of FIG. 1) to the left side of the display (e.g., the display module 160 of FIG. 1), and display the at least one new message on the right side of the display (e.g., the display module 160 of FIG. 1), based on a first message display direction.

According to various embodiments, the electronic device (e.g., the processor 120 of the electronic device 101 of FIG. 1 or the electronic device 101 of FIG. 2) may delete at least one message starting from the past message among at least a part of the displayed at least one first message, and additionally display a new message.

For example, when the number of the at least one first message displayed in the display (e.g., the display module 160 of FIG. 1) and at least one new message included in the second message exceeds a preset value, the electronic device (e.g., the processor 120 of the electronic device 101 of FIG. 1 or the electronic device 101 of FIG. 2) may delete at least one message starting from the past message (e.g., the oldest message) among the displayed at least one first message(s), and additionally display the at least one new message on the display (e.g., the display module 160 of FIG. 1).

In another embodiment, the electronic device (e.g., the processor 120 of the electronic device 101 of FIG. 1 or the electronic device 101 of FIG. 2) may delete a message, which is not included in a plurality of second messages included in a second notification, among the at least one first message(s) displayed on the display (e.g., the display module 160 of FIG. 1), and may additionally display at least one new message on the display (e.g., the display module 160 of FIG. 1).

According to various embodiments, the electronic device (e.g., the processor 120 of the electronic device 101 of FIG. 1 or the electronic device 101 of FIG. 2) may move a message, which is maintained, among the at least one first message(s) displayed on a display (e.g., the display module 160 of FIG. 1) to one side of the display (e.g., the display module 160 of FIG. 1), and may display at least one new message on the other side of the display (e.g., the display module 160 of FIG. 1).

According to various embodiments, when there is no message to be deleted or a new message among the messages included in the second notification, the electronic device (e.g., the processor 120 of the electronic device 101 of FIG. 1 or the electronic device 101 of FIG. 2) may maintain at least one first message displayed on the display (e.g., the display module 160 of FIG. 1).

According to another embodiment, when there is no message in common between at least one second message included in a second notification and at least one first message displayed on a display (e.g., the display module 160 of FIG. 1), the electronic device (e.g., the processor 120 of the electronic device 101 of FIG. 1 or the electronic device 101 of FIG. 2) may display at least one second message included in the second notification instead of displaying at least one first message displayed on the display (e.g., the display module 160 of FIG. 1).

According to various embodiments, the content of a notification view screen provided when a first chat group related to a first notification and a second chat group related to a second notification are the same will be described with reference to FIG. 4 below.

According to various embodiments, in operation 340, the electronic device (e.g., the processor 120 of the electronic device 101 of FIG. 1 or the electronic device 101 of FIG. 2) may display an indicator related to the second notification while at least a part of the at least one first message is displayed, when the first chat group and the second chat group are different.

According to various embodiments, an indicator related to a notification may include information about an application related to a notification (e.g., an application icon) and/or information about a sender (e.g., a sender ID or sender profile picture).

According to various embodiments, the electronic device (e.g., the processor 120 of the electronic device 101 of FIG. 1 or the electronic device 101 of FIG. 2) may display an indicator related to a second notification in a pop-up form while at least a part of the at least one first message is displayed, or display the same (i.e., the second notification) in the form of a notification bar on top of the display (e.g., the display module 160 of FIG. 1). As another embodiment, the electronic device (e.g., the processor 120 of the electronic device 101 of FIG. 1 or the electronic device 101 of FIG. 2) may display an indicator related to a second notification in an area where the at least one displayed first message is not displayed.

According to various embodiments, the electronic device (e.g., the processor 120 of the electronic device 101 of FIG. 1 or the electronic device 101 of FIG. 2) may display an indicator related to a second notification for a configured period of time, and may not display the indicator related to the second notification when the configured period of time has elapsed.

According to various embodiments, the content of a notification view screen provided when the first chat group related to a first notification and a second chat group related to a second notification are different will be described with reference to FIG. 5 below.

Figure 4:
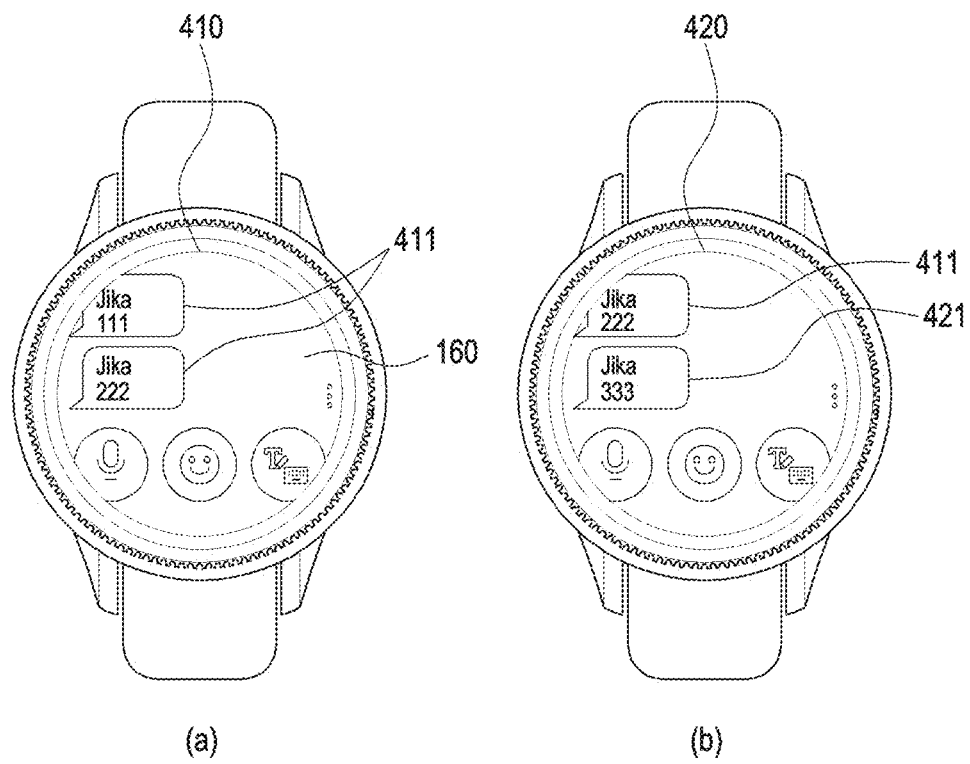
FIG. 4 illustrates an operation of providing a notification view by an electronic device when a first chat group related to a first notification and a second chat group related to a second notification are the same according to various embodiments.

FIG. 4 illustrates an operation of providing a notification view by an electronic device when a first chat group related to a first notification and a second chat group related to a second notification are the same. For example, view (a) illustrates an operation of providing a notification view by an electronic device (e.g., the processor 120 of the electronic device 101 of FIG. 1 or the electronic device 101 of FIG. 2) when a first notification is received, and view (b) illustrates an operation of providing a notification view when a second notification is received while providing a notification view for a first notification.

According to various embodiments, referring to view (a) in FIG. 4, an electronic device (e.g., the processor 120 of the electronic device 101 of FIG. 1 or the electronic device 101 of FIG. 2) may provide a notification view 410 for a first notification received from an external device (e.g., the electronic device 104 of FIG. 1 or the external device 104 of FIG. 2). For example, the notification view 410 for the first notification may display at least one first message(s) 411 included in the first notification on a display (e.g., the display module 160 of FIG. 1).

According to various embodiments, when a first notification is received, the electronic device (e.g., the processor 120 of the electronic device 101 of FIG. 1 or the electronic device 101 of FIG. 2) may display an indicator for the first notification for a configured period of time and then display the first notification view 410. For example, the indicator for the first notification may include information about an application related to the first notification (e.g., an application icon) and/or information about a sender (e.g., a sender ID or sender profile picture). For example, the indicator for the first notification may be in the form of a pop-up and/or a notification bar.

According to various embodiments, when a second notification is received from an external device (e.g., the electronic device 104 of FIG. 1 or the external device 104 of FIG. 2) in a state where the notification view 410 for the first notification is being provided, the electronic device (e.g., the processor 120 of the electronic device 101 of FIG. 1 or the electronic device 101 of FIG. 2) may identify whether a first chat group for the first notification and a second chat group for the second notification are the same.

According to various embodiments, when it is identified that the first chat group and the second chat group are the same, the electronic device (e.g., the processor 120 of the electronic device 101 of FIG. 1 or the electronic device 101 of FIG. 2) may provide a notification view 420 for a second notification, as shown in view (b) in FIG. 4. For example, the notification view 420 for the second notification may include at least one first message 411 included in the notification view 410 for the first notification and a new message 421 included in the second notification. The operation of identifying the new message 421 included in the second notification will be described below with reference to FIGS. 6 to 8.

According to various embodiments, the electronic device (e.g., the processor 120 of the electronic device 101 of FIG. 1 or the electronic device 101 of FIG. 2) may display the new message 421 included in the second notification before the at least one first message 411 included in the notification view 410 for the first notification, or in the middle of the at least one first message 411, or after the at least one first message 411.

According to various embodiments, the electronic device (e.g., the processor 120 of the electronic device 101 of FIG. 1 or the electronic device 101 of FIG. 2) may move at least one first message 411 included in the notification view 410 for the first notification to one side of the display 160 (e.g., the display module 160 of FIG. 1), and may display a new message 421 included in the second notification on the other side of the display 160 (e.g., the display module 160 of FIG. 1). According to various embodiments, the electronic device (e.g., the processor 120 of the electronic device 101 of FIG. 1 or the electronic device 101 of FIG. 2) may move at least one first message 411 included in the notification view 410 for the first notification to the upper side of the display 160 (e.g., the display module 160 of FIG. 1), and may display a new message 421 included in the second notification on the lower side of the display module 160 (e.g., the display module 160 of FIG. 1).

According to various embodiments, when the electronic device (e.g., the processor 120 of the electronic device 101 of FIG. 1 or the electronic device 101 of FIG. 2) may provide the notification view 420 for the second notification, when the first chat group and the second chat group are identified to be the same, instead of providing an indicator for the second notification.

Figure 5:
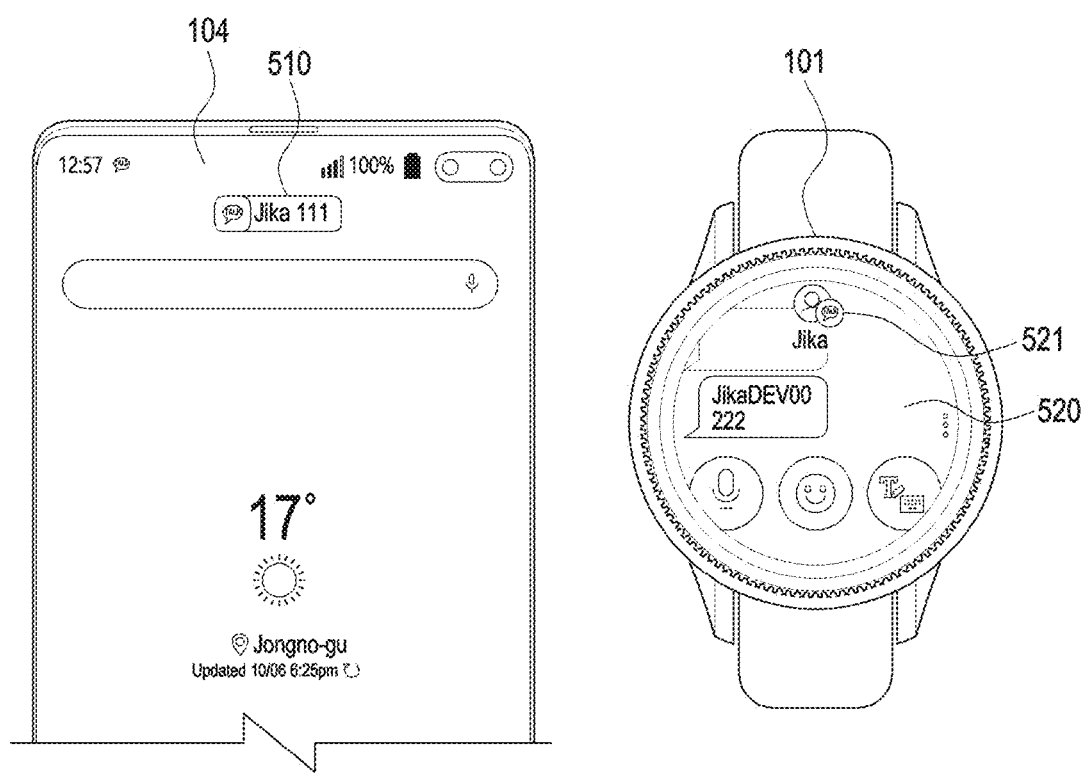
FIG. 5 illustrates an operation of providing a notification view by an electronic device when a first chat group related to a first notification and a second chat group related to a second notification are different from each other according to various embodiments.

FIG. 5 illustrates an operation of providing a notification view by an electronic device when a first chat group related to a first notification is different from a second chat group related to a second notification.

According to various embodiments, referring to FIG. 5, in a state where an electronic device 101 (e.g., the processor 120 of the electronic device 101 of FIG. 1 or the electronic device 101 of FIG. 2) is providing a notification view 520 for a first notification, an external device 104 (e.g., the electronic device 104 of FIG. 1 or the external device 104 of FIG. 2) may receive a new message.

According to various embodiments, the external device 104 (e.g., the electronic device 104 of FIG. 1 or the external device 104 of FIG. 2) may display a notification 510 for a new message on a display of the external device 104 (e.g., the electronic device 104 of FIG. 1 or the external device 104 of FIG. 2), and may transmit second notification including a new message to the electronic device 101 (e.g., the processor 120 of the electronic device 101 of FIG. 1 or the electronic device 101 of FIG. 2).

According to various embodiments, when a second notification is received from the external device 104 (e.g., the electronic device 104 of FIG. 1 or the external device 104 of FIG. 2) in a state where the electronic device 101 (e.g., the processor 120 of the electronic device 101 of FIG. 1 or the electronic device 101 of FIG. 2) is providing the notification view 520 for the first notification, the electronic device 101 (e.g., the processor 120 of the electronic device 101 of FIG. 1 or the electronic device 101 of FIG. 2) may identify whether a first chat group for the first notification and a second chat group for the second notification are the same.

According to various embodiments, when it is identified that the first chat group and the second chat group are different from each other, the electronic device 101 (e.g., the processor 120 of the electronic device 101 of FIG. 1 or the electronic device 101 of FIG. 2) may provide an indicator 521 for the second notification in a state where the notification view 520 for the first notification is being provided, as shown in FIG. 5. For example, the indicator 521 for the second notification may include information about an application related to the second notification (e.g., an application icon) and/or information about a sender (e.g., a sender ID or sender profile picture). For example, the indicator 521 for the second notification may be in the form of a pop-up and/or notification bar overlaid on the notification view 520 for the first notification.

According to various embodiments, the electronic device 101 (e.g., the processor 120 of the electronic device 101 of FIG. 1 or the electronic device 101 of FIG. 2) may display the indicator 521 for the second notification for a configured period of time, and may not display the indicator 521 related to the second notification when the configured time has elapsed.

Figure 6:
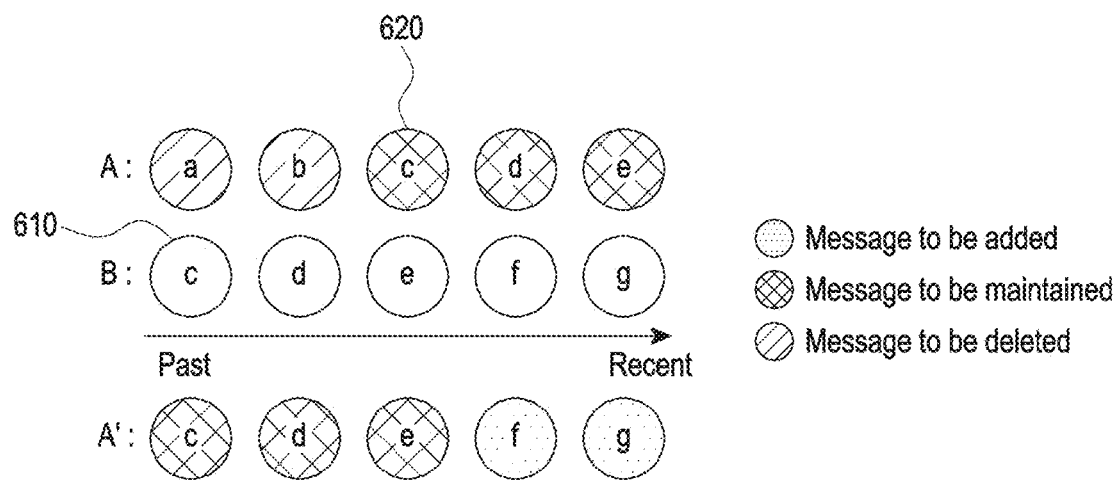
FIG. 6 illustrates an operation of identifying a new message included in a new notification according to various embodiments.

FIG. 6 illustrates an operation of identifying a new message included in a new notification according to various embodiments.

According to various embodiments, referring to FIG. 6, an electronic device (e.g., the processor 120 of the electronic device 101 of FIG. 1 or the electronic device 101 of FIG. 2) may obtain a second notification (B) while displaying at least a part of at least one message (e.g., a, b, c, d or e) included in a first notification (A) on a display (e.g., the display module 160 of FIG. 1). For ease of understanding, it is described that a plurality of messages (e.g., a, b, c, d or e) included in the first notification (A) are displayed in FIG. 6. However, the displayed message may be one, and only a part of the at least one message (e.g., a, b, c, d, or e), included in the first notification (A) may be displayed.

According to various embodiments, when it is identified that a first chat group related to the first notification (A) and a second chat group related to the second notification (B) are the same, the electronic device (e.g., the processor 120 of the electronic device 101 of FIG. 1 or the electronic device 101 of FIG. 2) may identify a new message included in a plurality of second messages (e.g., c, d, e, f, or g) in the second notification (B).

According to various embodiments, the electronic device (e.g., the processor 120 of the electronic device 101 of FIG. 1 or the electronic device 101 of FIG. 2) may identify, among a plurality of (first) messages (e.g., a, b, c, d, or e) of the first notification (A), a message corresponding to an earliest message 610 (e.g., c) among the plurality of second messages (e.g., c, d, e, f, or g) included in the second notification (B).

For example, the electronic device (e.g., the processor 120 of the electronic device 101 of FIG. 1 or the electronic device 101 of FIG. 2) may identify a third message 620 (e.g., c) of the first notification (A) among the displayed messages (e.g., a, b, c, d, or e) of the first notification (A), the third message corresponding to the earliest message 610 (e.g., c) among the plurality of messages (e.g., c, d, e, f, or g) included in the second notification (B).

According to various embodiments, the electronic device (e.g., the processor 120 of the electronic device 101 of FIG. 1 or the electronic device 101 of FIG. 2) may identify, as a message to be deleted, the message (e.g., a and b) before the identified third message 620 (e.g., c) of the first notification (A) among the displayed messages (e.g., a, b, c, d, or e) of the first notification (A).

According to various embodiments, the electronic device (e.g., the processor 120 of the electronic device 101 of FIG. 1 or the electronic device 101 of FIG. 2) may identify the number (e.g., 2) of messages (e.g., d and e) after the identified message 620 (e.g., c) among the displayed messages (e.g., a, b, c, d, or e) of the first notification (A).

According to various embodiments, the electronic device (e.g., the processor 120 of the electronic device 101 of FIG. 1 or the electronic device 101 of FIG. 2) may identify, as a message to be maintained, the earliest message (e.g., c) among a plurality of messages (e.g., c, d, e, f, or g) of the second notification (B) and the identified number of messages (e.g., d and e) from the earliest message (e.g., c), and may identify a message (e.g., f and g) after the message to be maintained (e.g., c, d, and e) as at least one new message included in the second notification (B).

Although an operation of identifying the number (e.g., 2) of messages (e.g., d and e) after the identified message 620 (e.g., c) among the displayed messages (e.g., a, b, c, d, or e) of the first notification (A) has been described in the above, the electronic device (e.g., the processor 120 of the electronic device 101 of FIG. 1 or the electronic device 101 of FIG. 2) may identify the length of the message (e.g., d and e) after the identified message 620 (e.g., c) among the displayed messages (e.g., a, b, c, d, or e) of the first notification (A) according to various embodiments. For example, the electronic device (e.g., the processor 120 of the electronic device 101 of FIG. 1 or the electronic device 101 of FIG. 2) may identify the length of the body of the message (e.g., d and e) after the identified message 620 (e.g., c) among the displayed messages (e.g., a, b, c, d, and e) of the first notification (A).

According to various embodiments, the electronic device (e.g., the processor 120 of the electronic device 101 of FIG. 1 or the electronic device 101 of FIG. 2) may identify, as a message to be maintained, the earliest message (e.g., c) among a plurality of second messages (e.g., c, d, e, f, or g) of the second notification (B) and the identified length of the message (e.g., d and e) from the earliest message (e.g., c), and may identify a message (e.g., f and g) after the message to be maintained (e.g., c, d, and e) as at least one new message included in the second notification (B).

According to another embodiment, the electronic device (e.g., the processor 120 of the electronic device 101 of FIG. 1 or the electronic device 101 of FIG. 2) may identify at least one subsequence (e.g., abcde, bcde, cde, de, or e) including the last message (e.g., e) among the messages (e.g., a, b, c, d, or e) of the first notification (A) and including consecutive messages thereof.

According to various embodiments, the electronic device (e.g., the processor 120 of the electronic device 101 of FIG. 1 or the electronic device 101 of FIG. 2) may identify at least one subsequence (e.g., c, cd, cde, cdef, or cdefg) including the earliest message (e.g., c) among the messages (e.g., c, d, e, f, or g) of the second notification (B) and including consecutive messages thereof.

According to various embodiments, the electronic device (e.g., the processor 120 of the electronic device 101 of FIG. 1 or the electronic device 101 of FIG. 2) may identify a subsequence (cde) having the longest common message length, between a subsequence (abcde, bcde, cde, de, or e) including the most recent message and consecutive in a subsequence of message history of the first notification (A), and a subsequence (c, cd, cde, cdef, or cdefg) including the oldest message and consecutive in a subsequence of message history of the second notification (B).

According to various embodiments, the electronic device (e.g., the processor 120 of the electronic device 101 of FIG. 1 or the electronic device 101 of FIG. 2) may identify, as a message to be maintained, the message (e.g., c, d, e) included in a subsequence (e.g., cde) having been identified with the longest common message length among messages (e.g., c, d, e, f, or g) of the second notification (B), and may identify messages (e.g., f and g) after the message to be maintained (e.g., c, d, and e), as at least one new message included in the second notification (B).

According to various embodiments, in a state where the display of messages to be deleted (e.g., a and b) among the displayed messages (e.g., a, b, c, d, and e) of the first notification (A) is deleted and the display of the message to be maintained (e.g., c, d, and e) is maintained, the electronic device (e.g., the processor 120 of the electronic device 101 of FIG. 1 or the electronic device 101 of FIG. 2) may additionally display at least one new message(s) (e.g., f and g) included in the second notifications (B) at a corresponding position in an order in which the plurality of messages (e.g., c, d, e, f, and g) included in the second notification (B) are received.

For example, the electronic device (e.g., the processor 120 of the electronic device 101 of FIG. 1 or the electronic device 101 of FIG. 2) may delete the display of the message to be deleted (e.g., a and b) among the displayed messages (e.g., a, b, c, d, and e) of the first notification (A), may move the messages to be maintained (e.g., c, d, and e) to one side of the display (e.g., the display module 160 of FIG. 1), and may display at least one new message (e.g., f and g) on the other side of the display (e.g., the display module 160 of FIG. 1).

Figure 7:
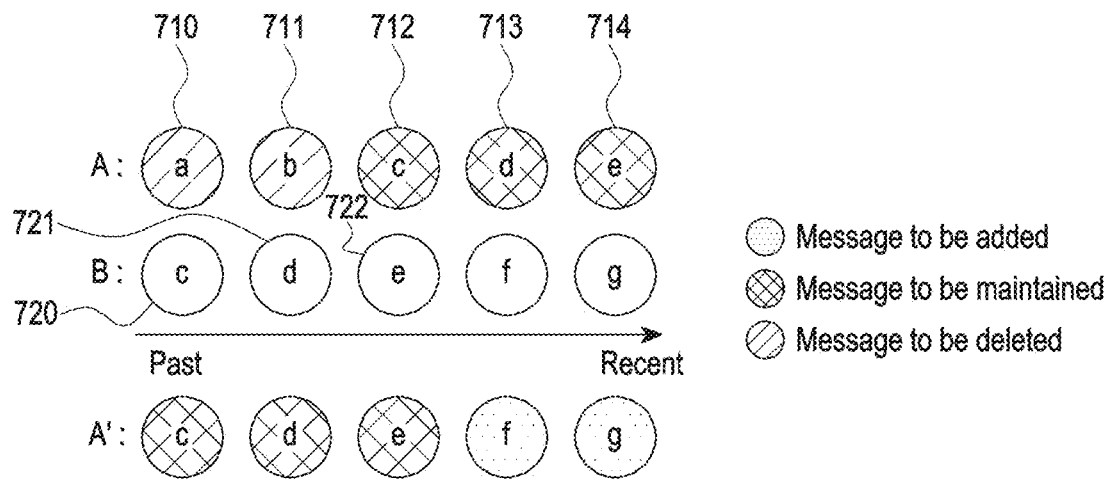
FIG. 7 illustrates an operation of identifying a new message included in a new notification according to various embodiments.

FIG. 7 illustrates an operation of identifying a new message included in a new notification according to various embodiments.

According to various embodiments, referring to FIG. 7, an electronic device (e.g., the processor 120 of the electronic device 101 of FIG. 1 or the electronic device 101 of FIG. 2) may obtain a second notification (B) while displaying at least a part of at least one message(s) (e.g., a, b, c, d or e) included in a first notification (A) on a display (e.g., the display module 160 of FIG. 1). For ease of understanding, it is described that a plurality of messages (e.g., a, b, c, d, or e) included in the first notification (A) are displayed in FIG. 7. However, the displayed message may be one, and only a part of the at least one message (e.g., a, b, c, d, or e) included in the first notification (A) may be displayed.

According to various embodiments, when it is identified that a first chat group related to the first notification (A) and a second chat group related to the second notification (B) are the same, the electronic device (e.g., the processor 120 of the electronic device 101 of FIG. 1 or the electronic device 101 of FIG. 2) may identify a new message included in a plurality of second messages (e.g., c, d, e, f, or g) in the second notification (B).

According to various embodiments, the electronic device (e.g., the processor 120 of the electronic device 101 of FIG. 1 or the electronic device 101 of FIG. 2) may identify whether an earliest message 710 (e.g., a) among the plurality of (first) messages (e.g., a, b, c, d, or e) of the first notification (A) and an earliest message 720 (e.g., c) among the plurality of second messages (e.g., c, d, e, f, or g) included in the second notification (B) correspond to each other. For example, the electronic device (e.g., the processor 120 of the electronic device 101 of FIG. 1 or the electronic device 101 of FIG. 2) may identify the number of common messages between the plurality of (first) messages of the first notification (A) and the plurality of second messages of the second notification (B), and may identify a new message and a common message included in the plurality of second messages included in the second notification (B), based on the number of identified common messages.

According to various embodiments, when the earliest message 710 (e.g., a) of the plurality of (first) messages (e.g., a, b, c, d, or e) of the first notification (A) and the earliest message 720 (e.g., c) of the plurality of second messages (e.g., c, d, e, f, or g) included in the second notification (B) do not correspond to each other, the electronic device (e.g., the processor 120 of the electronic device 101 of FIG. 1 or the electronic device 101 of FIG. 2) may identify whether a second message 711 (e.g., b) of the plurality of (first) messages (e.g., a, b, c, d, or e) of the first notification (A) and the earliest message 720 (e.g., c) of the plurality of second messages (e.g., c, d, e, f, or g) included in the second notification (B) correspond to each other. For example, the electronic device (e.g., the processor 120 of the electronic device 101 of FIG. 1 or the electronic device 101 of FIG. 2) may identify the number of common messages as 0.

According to various embodiments, when the second message 711 (e.g., b) of the plurality of (first) messages (e.g., a, b, c, d, or e) of the first notification (A) and the earliest message 720 (e.g., c) of the plurality of second messages (e.g., c, d, e, f, or g) included in the second notification (B) do not correspond to each other, the electronic device (e.g., the processor 120 of the electronic device 101 of FIG. 1 or the electronic device 101 of FIG. 2) may identify the number of common messages as 0, and may identify whether a third message 712 (e.g., c) of the plurality of first messages (e.g., a, b, c, d, or e) of the first notification (A) and the earliest message 720 (e.g., c) of the plurality of second messages (e.g., c, d, e, f, or g) included in the second notification (B) correspond to each other.

According to various embodiments, when the third message 712 (e.g., c) of the plurality of (first) messages (e.g., a, b, c, d, or e) of the first notification (A) and the earliest message 720 (e.g., c) of the plurality of second messages (e.g., c, d, e, f, or g) included in the second notification (B) correspond to (e.g., match) each other, the electronic device (e.g., the processor 120 of the electronic device 101 of FIG. 1 or the electronic device 101 of FIG. 2) may change the number of common messages to 1, and may identify whether a fourth message 713 (e.g., d) of the plurality of (first) messages (e.g., a, b, c, d, or e) of the first notification (A) and the second message 721 (e.g., d) of the plurality of second messages (e.g., c, d, e, f, or g) included in the second notification (B) correspond to each other.

According to various embodiments, when the fourth message 713 of the plurality of (first) messages of the first notification (A) and the second message 721 of the plurality of second messages included in the second notification (B) do not correspond to each other, the electronic device (e.g., the processor 120 of the electronic device 101 of FIG. 1 or the electronic device 101 of FIG. 2) may change the number of common messages to 0, and may identify whether a fourth message 713 of the plurality of (first) messages of the first notification (A) and the first message 720 (e.g., c) of the plurality of second messages included in the second notification (B) correspond to each other.

According to various embodiments, in a state where the number of common messages is 1, when the fourth message 713 (e.g., d) of the plurality of (first) messages (e.g., a, b, c, d, or e) of the first notification (A) and the second message 721 (e.g., d) of the plurality of second messages (e.g., c, d, e, f, or g) included in the second notification (B) correspond to (e.g., match) each other, the electronic device (e.g., the processor 120 of the electronic device 101 of FIG. 1 or the electronic device 101 of FIG. 2) may change the number of common messages to 2, and may identify whether a last message 714 (e.g., e) of the plurality of first messages (e.g., a, b, c, d, or e) of the first notification (A) and the third message 722 (e.g., e) of the plurality of second messages (e.g., c, d, e, f, or g) included in the second notification (B) correspond to each other.

According to various embodiments, when the last message 714 of the plurality of (first) messages of the first notification (A) and the third message 722 of the plurality of second messages included in the second notification (B) do not correspond to each other, the electronic device (e.g., the processor 120 of the electronic device 101 of FIG. 1 or the electronic device 101 of FIG. 2) may change the number of common messages to 0, and may identify whether the last message 714 of the plurality of (first) messages of the first notification (A) and the first message 720 (e.g., c) of the plurality of second messages (e.g., c, d, e, f, or g) included in the second notification (B) correspond to each other.

According to various embodiments, in a state where the number of common messages is 2, when the last message 714 (e.g., e) of the plurality of (first) messages (e.g., a, b, c, d, or e) of the first notification (A) and the third message 722 (e.g., e) of the plurality of (second) messages (e.g., c, d, e, f, or g) included in the second notification (B) correspond to (e.g., match) each other, the electronic device (e.g., the processor 120 of the electronic device 101 of FIG. 1 or the electronic device 101 of FIG. 2) may change the number of common messages to 3, and may terminate an operation of identifying whether the last message and the third message correspond to each other. For example, the identification of the last message 714 (e.g., e) among the plurality of (first) messages (e.g., a, b, c, d, or e) of the first notification (A) is completed, the electronic device (e.g., the processor 120 of the electronic device 101 of FIG. 1 or the electronic device 101 of FIG. 2) may terminate an operation of identifying whether the last message and the third message correspond to each other and identify the number of common messages as 3.

According to various embodiments, the electronic device (e.g., the processor 120 of the electronic device 101 of FIG. 1 or the electronic device 101 of FIG. 2) may identify, as a message to be maintained, messages (e.g., c, d, and e), which are identified to correspond to the messages of the second notification (B), among the plurality of (first) messages of the first notification (A), based on the number of identified common messages.

According to various embodiments, the electronic device (e.g., the processor 120 of the electronic device 101 of FIG. 1 or the electronic device 101 of FIG. 2) may identify messages (e.g., f and g), after messages to be maintained (indicated by reference numerals 720, 721, and 722) (e.g., c, d, and e), of the plurality of second messages (e.g., c, d, e, f, and g) of the second notification (B) as at least one new message(s) included in the second notification (B).

According to various embodiments, in a state where messages to be deleted (e.g., a and b) among the displayed messages (e.g., a, b, c, d, and e) of the first notification (A) are deleted and the display of the message to be maintained (e.g., c, d, and e) is maintained, the electronic device (e.g., the processor 120 of the electronic device 101 of FIG. 1 or the electronic device 101 of FIG. 2) may additionally display at least one new message(s) (e.g., f and g) included in the second notifications (B) at a corresponding position in an order in which the plurality of second messages (e.g., c, d, e, f, and g) included in the second notification (B) are received.

For example, the electronic device (e.g., the processor 120 of the electronic device 101 of FIG. 1 or the electronic device 101 of FIG. 2) may delete the messages to be deleted (e.g., a and b) among the displayed messages (e.g., a, b, c, d, and e) of the first notification (A), may move the message to be maintained (e.g., c, d, and e) to one side of the display (e.g., the display module 160 of FIG. 1), and may display at least one new message(s) (e.g., f and g) on the other side of the display (e.g., the display module 160 of FIG. 1).

FIG. 8 illustrates an operation of identifying a new message included in a new notification according to various embodiments. For example, FIG. 8 illustrates an operation of identifying a new message by using a longest common subsequence (LCS) algorithm for obtaining the longest common subsequence between two sequences. For example, a sequence (subsequence) may include a character string (substring). According to various embodiments, the electronic device (e.g., the processor 120 of the electronic device 101 of FIG. 1 or the electronic device 101 of FIG. 2) may identify, by using the longest common subsequence (LCS) algorithm, a longest subsequence (LCS) in a subsequence which is not consecutive but has a common part between the two sequences and a longest length value (LCS length value).

According to various embodiments, referring to FIG. 8, row 1 may be a message history (e.g., ACAYKP) of a plurality of first messages included in a first notification, and column 1 may be a message history of (e.g., CAPCAK) of a plurality of second messages included in a second notification. For example, each alphabet may imply (or represent)

each message in the message history. According to an embodiment, '0' located before a sequence of each message included in row 1 and column 1 may be a value added for the LCS algorithm, rather than an actual value of each sequence.

According to various embodiments, the electronic device (e.g., the processor 120 of the electronic device 101 of FIG. 1 or the electronic device 101 of FIG. 2) may identify an LCS length value in a manner of, when the same character appears, adding 1 to the LCS length value starting from 0. For example, a value in a row may be calculated based on a value in a previous row.

According to various embodiments, the length of the previous LCS may refer to a value located in an upper-left diagonal line rather than a left value. This is for adding 1 to the length of LCS before comparing two characters to be compared in two sequences.

According to various embodiments, the electronic device (e.g., the processor 120 of the electronic device 101 of FIG. 1 or the electronic device 101 of FIG. 2) may maintain, as it is, the length value of the previous LCS including the compared characters, when the compared characters are different. For example, the electronic device (e.g., the processor 120 of the electronic device 101 of FIG. 1 or the electronic device 101 of FIG. 2) may maintain the LCS length value at a larger value among the left value and the upper value when the compared characters are different.

For example, row 3 of the table shown in FIG. 8 represents 'C', which is the first character in a sequence of a plurality of second message, and a value indicating the length of a common subsequence in a sequence of a plurality of first messages (e.g., ACAYKP). Further, the LCS length value may be maintained at 0 in columns 2 and 3, and the value of 1 may be added in column 4. The LCS length value of columns 5 to 8 of row 3 may be 1, which is a larger value among the left value and the upper value.

According to various embodiments, the electronic device (e.g., the processor 120 of the electronic device 101 of FIG. 1 or the electronic device 101 of FIG. 2) may obtain the values of rows 4 to 8 as shown in the table shown in FIG. 8 by obtaining the LCS values of each sequence (e.g., CAPCAK) of the plurality of second messages and the sequence (e.g., ACAYKP) of the plurality of first messages.

According to various embodiments, the electronic device (e.g., the processor 120 of the electronic device 101 of FIG. 1 or the electronic device 101 of FIG. 2) may identify a position 810 (e.g., row 8 and column 7) in which the largest value (e.g., 4) among the LCS length values obtained as shown in FIG. 8 is started, and identify a position in which a value smaller by one than the largest value is started, wherein only one position may be identified in each row and column.

For example, referring to FIG. 8, the electronic device (e.g., the processor 120 of the electronic device 101 of FIG. 1 or the electronic device 101 of FIG. 2) may identify a position 820 (e.g., row 7 and column 5) in which the second largest value (e.g., 3) among the LCS length values is started, and identify a position 830 (e.g., row 6 and column 4) in which the third largest value (e.g., 2) among the LCS length values is started and a position 840 (e.g., row 4 and column 3) in which the fourth largest value (e.g., 1) among the LCS length values is started.

According to various embodiments, the electronic device (e.g., the processor 120 of the electronic device 101 of FIG. 1 or the electronic device 101 of FIG. 2) may identify that the LCS is 'ACAK', based on the identified positions 810, 820, 830, and 840.

According to various embodiments, the electronic device (e.g., the processor 120 of the electronic device 101 of FIG. 1 or the electronic device 101 of FIG. 2) may identify, as a new message, a message after the obtained LCS among the plurality of second messages included in the second notification, and may identify a message before the LCS of the displayed first message as a message the display of which is to be deleted. For example, the electronic device (e.g., the processor 120 of the electronic device 101 of FIG. 1 or the electronic device 101 of FIG. 2) may identify, as a message to be maintained, 'ACAK' corresponding to the LCS of the displayed first message (e.g., ACAYKP), and may identify 'YP', which is a message other than the message to be maintained, as a message(s) the display of which is to be deleted.

According to various embodiments, the electronic device (e.g., the processor 120 of the electronic device 101 of FIG. 1 or the electronic device 101 of FIG. 2) may identify, as a new message, a message after 'ACAK' corresponding to the LCS among the plurality of second messages included in the second notification.

According to various embodiments, the electronic device (e.g., the processor 120 of the electronic device 101 of FIG. 1 or the electronic device 101 of FIG. 2) may additionally display at least one new message included in a second notification (B) at a corresponding position in an order in which a plurality of second messages (e.g., c, d, e, f, or g) (not shown in FIG. 8) included in the second notification are received, in a state where the display of a message to be deleted from among the displayed messages of the first notification is deleted and the display of a message to be maintained is maintained.

For example, the electronic device (e.g., the processor 120 of the electronic device 101 of FIG. 1 or the electronic device 101 of FIG. 2) may delete the display of the message to be deleted among the first messages of the displayed first notification, may move the message(s) to be maintained to one side of the display (e.g., the display module 160 of FIG. 1), and may display the at least one new message included in the second message on the other side of the display (e.g., the display module 160 of FIG. 1).

Figure 9:
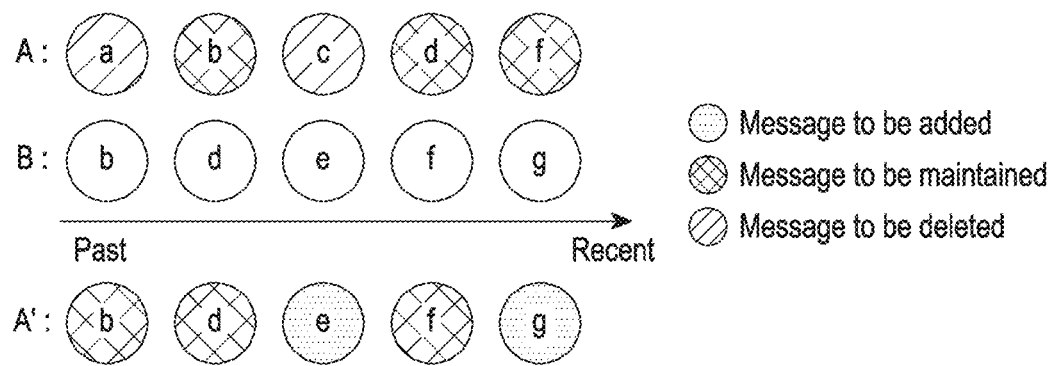
FIG. 9 illustrates an operation of identifying a new message included in a new notification according to various embodiments.

FIG. 9 illustrates an operation of identifying a new message included in a new notification according to various embodiments.

According to various embodiments, referring to FIG. 9, an electronic device (e.g., the processor 120 of the electronic device 101 of FIG. 1 or the electronic device 101 of FIG. 2) may obtain a second notification (B) while displaying at least a part of at least one message (e.g., a, b, c, d or f) included in a first notification (A) on a display (e.g., the display module 160 of FIG. 1). For ease of understanding, it is described that a plurality of (first) messages (e.g., a, b, c, d, or f) included in the first notification (A) are displayed in FIG. 9. However, the displayed message may be one, and only a part of the at least one message (e.g., a, b, c, d, or f) included in the first notification (A) may be displayed.

According to various embodiments, when it is identified that a first chat group related to the first notification (A) and a second chat group related to the second notification (B) are the same, the electronic device (e.g., the processor 120 of the electronic device 101 of FIG. 1 or the electronic device 101 of FIG. 2) may identify a new message included in a plurality of second messages (e.g., b, d, e, f, or g) of the second notification (B).

For example, the electronic device (e.g., the processor 120 of the electronic device 101 of FIG. 1 or the electronic device 101 of FIG. 2) may identify a common message (e.g., b, d, and f) between a plurality of (first) messages (e.g., a, b, c, d, or f) included in the first notification (A) and a plurality of (second) messages (e.g., b, d, e, f, or g) included in the second notification (B) by using the LCS algorithm shown in FIG. 8. According to various embodiments, the electronic device (e.g., the processor 120 of the electronic device 101 of FIG. 1 or the electronic device 101 of FIG. 2) may identify, as a new message, a message(s) (e.g., e, g) other than the common message among the plurality of messages (e.g., b, d, e, f, or g) included in the second notification (B).

According to various embodiments, the electronic device (e.g., the processor 120 of the electronic device 101 of FIG. 1 or the electronic device 101 of FIG. 2) may additionally display at least one new message (e.g., e and g) included in the second notification (B) at a corresponding position in an order in which a plurality of second messages (e.g., b, d, e, f, or g) included in the second notification (B) are received, in a state where the display of a message(s) (e.g., a and c) to be deleted from among the displayed messages (e.g., a, b, c, d, or, f) of the first notification (A) is deleted and the display of a message(s) (e.g., b, d, or f) to be maintained is maintained.

For example, the electronic device (e.g., the processor 120 of the electronic device 101 of FIG. 1 or the electronic device 101 of FIG. 2) may delete the message to be deleted (e.g., a, c) among the displayed message(s)(e.g., a, b, c, d, or f) of the first notification (A) and, based on a corresponding position in an order in which a plurality of second messages (e.g., b, d, e, f, or g) included in the second notification (B) are received, may display a new message e between the messages d and f to be maintained and display a new message g after the message f to be maintained.

According to various embodiments, an electronic device electronic device (e.g., the processor 120 of the electronic device 101 of FIG. 1 or the electronic device 101 of FIG. 2) may include a display (e.g., the display module 160 of FIG. 1) and a processor (e.g., the processor 120 of FIG. 1) operatively connected to the display, wherein the processor may be configured to display, on the display, at least a part of at least one first message included in a first notification, when a second notification is acquired while at least a part of the at least one first message is displayed, identify whether a first chat group corresponding to the at least one first message is the same as a second chat group corresponding to a plurality of second messages included in the second notification, when the first chat group is the same as the second chat group, identify at least one new message included in the plurality of second messages based on the at least one first message and the plurality of second messages, and further display, on the display, the at least one new message while at least a part of the at least one first message is displayed, and when the first chat group and the second chart group are different from each other, display, on a part of the display, an indicator related to the second notification while at least a part of the at least one first message is displayed.

According to various embodiments, the processor (e.g., the processor 120 of FIG. 1) may be configured to identify whether the first chat group and the second chat group are the same based on panel IDs of the first chat group and the second chat group, respectively.

According to various embodiments, the at least one message included in the first notification and a plurality of messages included in the second notification are arranged in a time sequence, and the processor (e.g., the processor 120 of FIG. 1) may be configured to identify at least one first subsequence including a last message among at least one message of the first notification and including a consecutive message, identify at least one second subsequence including the earliest message among the plurality of messages of the second notification and including a consecutive message, identify a message included in a subsequence having the largest number of common messages among the at least one first subsequence and the at least one second subsequence, and identify, as the at least one new message, a message after a message included in a subsequence having the largest number of common messages among the plurality of second messages.

According to various embodiments, the processor (e.g., the processor 120 of FIG. 1) may be configured to identify a longest common subsequence (LCS) between the at least one first message and the plurality of second messages based on an algorithm for obtaining the LCS between two sequences, and identify, as the at least one new message, a message, which is not included in the identified LCS, among the plurality of second messages.

According to various embodiments, the processor (e.g., the processor 120 of FIG. 1) may be configured to delete a message, which is not included in the plurality of messages included in the second notification, among at least a part of the displayed at least one first message, and further display the at least one new message on the display (e.g., the display module 160 of FIG. 1).

According to various embodiments, the processor (e.g., the processor 120 of FIG. 1) may be configured to, when the number of the at least one new message and at least a part of the displayed at least one first message exceeds a preset value, delete at least one message from the oldest message among at least a part of the displayed at least one first message, and further display the at least one new message on the display (e.g., the display module 160 of FIG. 1).

According to various embodiments, the processor (e.g., the processor 120 of FIG. 1) may be configured to display the at least one new message at a corresponding position in an order in which a plurality of second messages included in the second notification are received.

According to various embodiments, the processor (e.g., the processor 120 of FIG. 1) may be configured to display the at least one new message at a midway point through the at least one first message, the midway point being a corresponding position in an order in which a plurality of second messages included in the second notification are received.

According to various embodiments, the processor (e.g., the processor 120 of FIG. 1) may be configured to move at least a part of the displayed at least one first message to one side of the display (e.g., the display module 160 of FIG. 1), and display the at least one new message on the other side thereof indicating a corresponding position in an order in which a plurality of second messages included in the second notification are received.

According to various embodiments, the electronic device (e.g., the processor 120 of the electronic device 101 of FIG. 1 or the electronic device 101 of FIG. 2) may be a wearable device.

According to various embodiments, a method for controlling an electronic device (e.g., the processor 120 of the electronic device 101 of FIG. 1 or the electronic device 101 of FIG. 2) may include displaying at least a part of at least one first message included in the first notification on a display (e.g., the display module 160 of FIG. 1), when a second notification is acquired while at least a part of the at least one first message is displayed, identifying whether a first chat group corresponding to the at least one first message is the same as a second chat group corresponding to a plurality of second messages included in the second notification, when the first chat group is the same as the second chat group, identifying at least one new message included in the plurality of second messages based on the at least one first message and the plurality of second messages, and further displaying, on the display, the at least one new message while at least a part of the at least one first message is displayed, and when the first chat group and the second chart group are different from each other, displaying, on a part of the display, an indicator related to the second notification while at least a part of the at least one first message is displayed.

According to various embodiments, the identifying may include identifying whether the first chat group and the second chat group are the same based on panel IDs of the first chat group and the second chat group, respectively.

According to various embodiments, the at least one message included in the first notification and the plurality of second messages included in the second notification are arranged in a time sequence, and the identifying the at least one new message may include identifying at least one first subsequence including a last message among at least one message of the first notification and including a consecutive message, identifying at least one second subsequence including the earliest message among the plurality of second messages of the second notification and including a consecutive message, identifying a message included in a subsequence having the largest number of common messages among the at least one first subsequence and the at least one second subsequence, and identifying, as the at least one new message, a message after a message included in a subsequence having the largest number of common messages among the plurality of second messages.

According to various embodiments, the identifying the at least one new message may include identifying a longest common subsequence (LCS) between the at least one first message and the plurality of second messages based on an algorithm for obtaining the LCS between two sequences, and identifying, as the at least one new message, a message, which is not included in the identified LCS, among the plurality of second messages.

According to various embodiments, the further displaying of the at least one new message may include deleting a message, which is not included in the plurality of second messages included in the second notification, among at least a part of the displayed at least one first message, and further displaying the at least one new message on the display (e.g., the display module 160 of FIG. 1).

According to various embodiments, the further displaying of the at least one new message may include, when the number of the at least one new message and at least a part of the displayed at least one first message exceeds a preset value, deleting at least one message from the oldest message among at least a part of the displayed at least one first message, and further displaying the at least one new message on the display (e.g., the display module 160 of FIG. 1).

According to various embodiments, the further displaying of the at least one new message may include displaying the at least one new message at a corresponding position in an order in which a plurality of second messages included in the second notification are received.

According to various embodiments, the further displaying of the at least one new message may include displaying the at least one new message at a midway point through the at least one first message, the midway point being a corresponding position in an order in which a plurality of second messages included in the second notification are received.

According to various embodiments, the further displaying of the at least one new message may include moving at least a part of the displayed at least one first message to one side of the display (e.g., the display module 160 of FIG. 1), and displaying the at least one new message on the other side thereof indicating a corresponding position in an order in which a plurality of second messages included in the second notification are received.

According to various embodiments, the electronic device (e.g., the processor 120 of the electronic device 101 of FIG. 1 or the electronic device 101 of FIG. 2) may be a wearable device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:
    a display;
    communication circuitry;
    a processor; and
    memory storing instructions that, when executed by the processor, cause the wearable electronic device to:
    receive, through the communication circuitry, a first notification including at least one first message, from an external electronic device,
    display, on the display, at least a part of the at least one first message,
    receive, through the communication circuitry, a second notification including a plurality of second messages, from the external electronic device, in a state that at least the part of the at least one first message is displayed,
    based on a first chat group corresponding to the at least one first message being the same as a second chat group corresponding to the plurality of second messages, identify at least one new message included in the plurality of second messages based on the at least one first message and the plurality of second messages, and further display, on the display, the at least one new message in the state that at least the part of the at least one first message is displayed, and
    based on the first chat group and the second chat group being different from each other, display, on the display, an indicator related to the second notification in the state that at least the part of the at least one first message is displayed.

2. The wearable electronic device of claim 1, wherein the instructions, when executed by the processor, cause the wearable electronic device to, identify whether the first chat group and the second chat group are the same based on panel identifications (IDs) of the first chat group and the second chat group, respectively.

3. The wearable electronic device of claim 1, wherein at least one message included in the first notification and the plurality of second messages included in the second notification are arranged in a time sequence, and
    wherein the instructions, when executed by the processor, cause the wearable electronic device to:
    identify at least one first subsequence including a last message from the at least one message of the first notification and including a consecutive message;
    identify at least one second subsequence including an earliest message among the plurality of second messages of the second notification and including the consecutive message;
    identify a given message included in another subsequence having a largest number of common messages among the at least one first subsequence and the at least one second subsequence; and
    identify, as the at least one new message, another message after the given message included in the another subsequence having the largest number of common messages among the plurality of second messages.

4. The wearable electronic device of claim 1, wherein the instructions, when executed by the processor, cause the wearable electronic device to:
    identify a longest common subsequence (LCS) between the at least one first message and the plurality of second messages based on an algorithm for obtaining the LCS between two sequences; and
    identify, as the at least one new message, a message, which is not included in the LCS that is identified, among the plurality of second messages.

5. The wearable electronic device of claim 1, wherein the instructions, when executed by the processor, cause the wearable electronic device to, delete a message, which is not included in the plurality of second messages included in the second notification, among at least the part of the at least one first message that is displayed, and further display the at least one new message on the display.

6. The wearable electronic device of claim 1, wherein the instructions, when executed by the processor, cause the wearable electronic device to, based on a number of the at least one new message and at least the part of the at least one first message that is displayed exceeding a preset value, delete at least one message from an oldest message among at least the part of the at least one first message that is displayed, and further display the at least one new message on the display.

7. The wearable electronic device of claim 1, wherein the instructions, when executed by the processor, cause the wearable electronic device to, display the at least one new message at a corresponding position in an order in which the plurality of second messages included in the second notification are received.

8. The wearable electronic device of claim 7, wherein the instructions, when executed by the processor, cause the wearable electronic device to, display the at least one new message at a midway point through the at least one first message, the midway point being a corresponding position in an order in which the plurality of second messages included in the second notification are received.

9. The wearable electronic device of claim 7, wherein the instructions, when executed by the processor, cause the wearable electronic device to, move at least the part of the at least one first message that is displayed to one side of the display, and display the at least one new message on another side thereof indicating a corresponding position in an order in which the plurality of second messages included in the second notification are received.

10. The wearable electronic device of claim 1, wherein the first notification does not include identification information for each of the at least one first message, and
wherein the second notification does not include identification information for each of the plurality of second messages.

11. A method for controlling a wearable electronic device, the method comprising:
receiving a first notification including at least one first message, from an external electronic device;
displaying at least a part of the at least one first message on a display of the wearable electronic device;
receiving a second notification including a plurality of second messages, from the external electronic device, in a state that at least the part of the at least one first message is displayed;
based on a first chat group corresponding to the at least one first message being the same as a second chat group corresponding to the plurality of second messages, identifying at least one new message included in the plurality of second messages based on the at least one first message and the plurality of second messages, and further displaying, on the display, the at least one new message in the state that at least the part of the at least one first message is displayed; and
based on the first chat group and the second chat group being different from each other, displaying, on the display, an indicator related to the second notification in the state that at least the part of the at least one first message is displayed.

12. The method of claim 11, wherein the identifying comprises identifying whether the first chat group and the second chat group are the same based on panel identifications (IDs) of the first chat group and the second chat group, respectively.

13. The method of claim 11, wherein at least one message included in the first notification and the plurality of second messages included in the second notification are arranged in a time sequence, and
the identifying of the at least one new message comprises:
identifying at least one first subsequence including a last message from the at least one message of the first notification and including a consecutive message;
identifying at least one second subsequence including an earliest message among the plurality of second messages of the second notification and including the consecutive message;
identifying a given message included in another subsequence having a largest number of common messages among the at least one first subsequence and the at least one second subsequence; and
identifying, as the at least one new message, a message after the given message included in the another subsequence having the largest number of common messages among the plurality of second messages.

14. The method of claim 11, wherein the identifying of the at least one new message comprises:
identifying a longest common subsequence (LCS) between the at least one first message and the plurality of second messages based on an algorithm for obtaining the LCS between two sequences; and
identifying, as the at least one new message, a message which is not included in the LCS that is identified among the plurality of second messages.

15. The method of claim 11, wherein the further displaying of the at least one new message comprises deleting a message, which is not included in the plurality of second messages included in the second notification, among at least the part of the at least one first message that is displayed, and further displaying the at least one new message on the display.

16. The method of claim 11, wherein the further displaying of the at least one new message comprises, based on a number of the at least one new message and at least the part of the at least one first message that is displayed exceeding a preset value, deleting at least one message from an oldest message among at least the part of the at least one first message that is displayed, and further displaying the at least one new message on the display.

17. The method of claim 11, wherein the further displaying of the at least one new message comprises, displaying the at least one new message at a corresponding position in an order in which the plurality of second messages included in the second notification are received.

18. The method of claim 17, wherein the further displaying of the at least one new message comprises, displaying the at least one new message at a midway point through the at least one first message, the midway point being a corresponding position in an order in which the plurality of second messages included in the second notification are received.

19. The method of claim 17, wherein the further displaying of the at least one new message comprises, moving at least the part of the at least one first message that is displayed to one side of the display, and displaying the at least one new message on another side thereof indicating a corresponding position in an order in which the plurality of second messages included in the second notification are received.

20. One or more non-transitory computer-readable storage media storing computer-executable instructions that, when executed by a processor of a wearable electronic device, cause the wearable electronic device to perform operations, the operations comprising:
receiving a first notification including at least one first message, from an external electronic device;
displaying at least a part of the at least one first message on a display of the wearable electronic device;
receiving a second notification including a plurality of second messages, from the external electronic device, in a state that at least the part of the at least one first message is displayed;
based on a first chat group corresponding to the at least one first message being the same as a second chat group corresponding to the plurality of second messages, identifying at least one new message included in the plurality of second messages based on the at least one first message and the plurality of second messages, and further displaying, on the display, the at least one new message in the state that at least the part of the at least one first message is displayed; and based on the first chat group and the second chat group being different from each other, displaying, on the display, an indicator related to the second notification in the state that at least the part of the at least one first message is displayed.

\* \* \* \* \*